INVENTOR
WALLACE RONALD BROOKSBANK

BY *Norris & Bateman*

ATTORNEYS

Nov. 16, 1965  W. R. BROOKSBANK  3,217,555
ENDLESS BELT AND METHOD OF MAKING
Filed Feb. 23, 1965  2 Sheets-Sheet 2
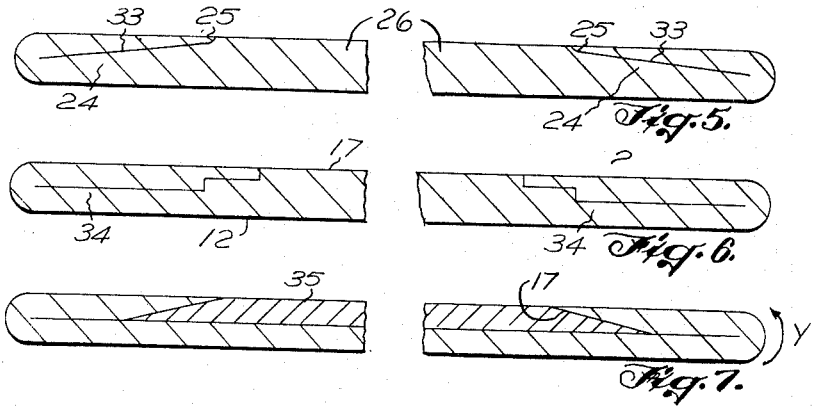
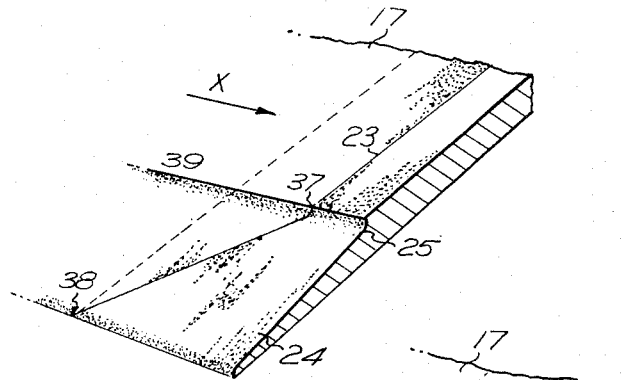
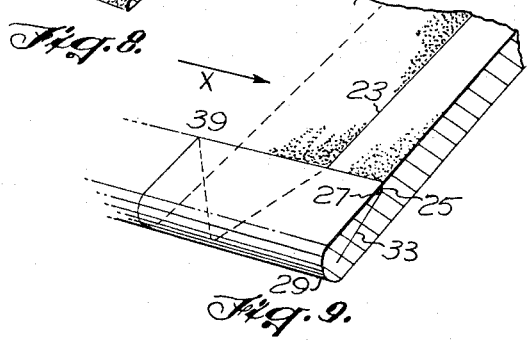
INVENTOR:
WALLACE RONALD BROOKSBANK
BY
Norris & Bateman
Attorneys

United States Patent Office 3,217,555
Patented Nov. 16, 1965

3,217,555
ENDLESS BELT AND METHOD OF MAKING
Wallace R. Brooksbank, Embsay Tanner,
Skipton, England
Filed Feb. 23, 1965, Ser. No. 434,206
7 Claims. (Cl. 74—232)

This is a continuation-in-part of application Ser. No. 144,922 filed Oct. 13, 1961, and now abandoned.

This invention relates to endless belts, such as are used for driving, conveying and like purposes, and is particularly concerned with novel endless belt structure wherein the margins and opposite ends of a single ply strip of leather are formed and secured together in a novel and advantageous manner.

The preferred embodiment of the invention will be described as applied to an endless leather belt that is particularly useful in the textile trade, where it is desirable that the belt have, in addition to an efficient drive engagement with the pulleys, a smooth outer working surface for the transfer of slivers in which surface there are no indentations or irregularities to entrap or snag the fibers or otherwise distort the slivers. Such belts desirably have continuous rounded side edges to resist abrasion and the formation of rough portions along the sliver lengths.

The belt of the invention, as will appear, retains the thickness and longitudinal strength of the original strip from which it was formed.

It has been proposed, as in applicant's earlier Patent No. 3,007,826 issued Nov. 6, 1961, to provide an endless belt of special folded over construction seeking to attain surface smoothness and optimum strength at the transverse joint, and while the belt of the patent has its advantages the belt of the present invention improves thereover for certain usages, with some of the practical advantages being that the leather strip for forming the belt of the invention need be only fractionally wider than the finished belt with attendant lower material costs.

It is the major object of this invention to provide a novel endless belt made of a single ply of material such as leather.

It is a further object of the invention to provide a novel endless belt made from a single ply strip which is made by permanently securing the strip ends together in an overlap joint and subsequently recessing and folding inwardly both edge regions to form a uniform cross section belt having rounded side edges.

Another object of the invention is to provide a novel endless leather belt made from a single ply strip wherein the strip has its ends secured together in a uniform cross section scarf joint, then the side edge areas of the strip at the inner (usually flesh) side are recessed to about half the original strip thickness, and then the edge regions are folded inwardly and secured in abutment with the central region to fill the recesses and form a uniform belt cross-section having the thickness of the original strip.

Further objects of the invention will appear as the description proceeds in connection with the appended claims and the annexed drawings wherein:

FIGURE 5 is a transverse section of a belt provided with a straight taper along the edges;

FIGURE 6 is a similar section of a belt provided with a stepped taper along the edges;

FIGURE 7 is a similar section of a belt provided with a reinforcing ply;

FIGURE 8 is a fragmentary perspective view of a belt shown in FIGURE 5 before the folded edge has been folded back on itself;

FIGURE 9 is a similar view after the chamfered portion has been folded over.

FIGURE 1 shows an endless leather belt 11 formed according to the preferred embodiment of the invention wherein the outer surface 12 is the smooth grainy hair or hide side of the leather and is substantially continuous. The finished belt is only slightly narrower than the starting leather strip as will appear.

Figure 2:
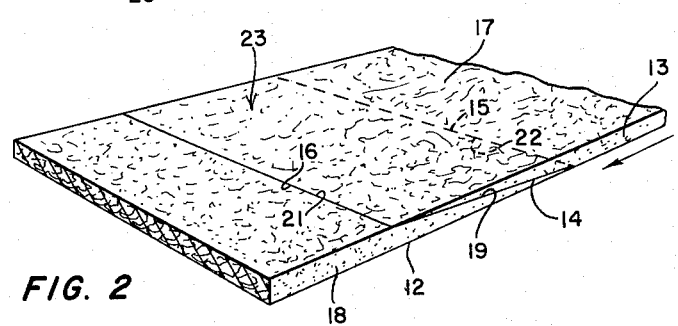
FIGURE 2 is an enlarged fragmentary generally perspective view looking at the inner or flesh side of the belt at the scarf joint between the ends of the strip composing the belt, showing the first significant step in making the belt from the strip.

FIGURE 2 is an enlarged top view of a section of the leather strip at the transverse joint formed during the initial stages of manufacture. Belt 11 is made from a single ply length of constant thickness and width leather that has one wedge shaped end 13 which is chamfered to form a tapered surface 14 that extends from transverse line 15 on the smooth hide surface 12 to a parallel transverse relatively thin end edge 16 across the rougher flesh surface 17. Line 15 and edge 16 are parallel. Similarly the other wedge shaped end 18 of the belt is chamfered to form a correspondingly tapered surface 19 that extends from a transverse line 21 across the flesh surface 17 to a parallel transverse thin end edge 22 at the hide surface. Thus each opposite end of the strip terminates in a thin straight edge merging smoothly into the adjacent surface.

The tapered surfaces 14 and 19 have the same angularity and area, so that they may be placed in opposed overlapping contact as shown in FIGURE 2 in a scarf joint 23 with a suitable adhesive cement spread over the interface. When the adhesive dries the leather strip ends are permanently joined in scarf joint 23 which has the same thickness and width as the original belt strip and is effectively an integral continuation of the strip to form an endless strip.

It will be noted, see FIGURE 2, that where the direction of normal belt movement is in the direction of the arrow the outer thin edge 22 is rearwardly of the inner edge whereby the open trailing end of the taper last encounters the sliver when the belt is used in a textile machine with its outer surface 12 engaging and conveying a sliver.

Figure 3:
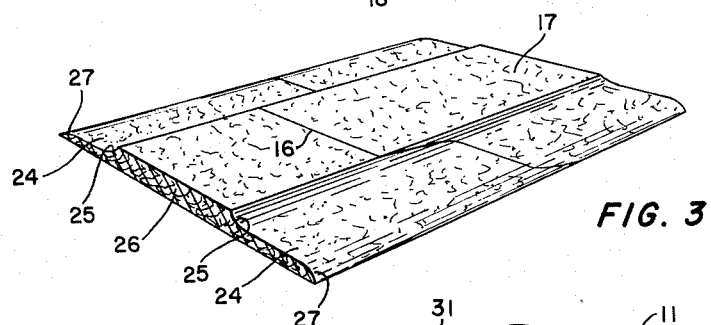
FIGURE 3 is a view similar to FIGURE 2 showing the intermediate step of recessing the strip margins.

FIGURE 3 illustrates an intermediate significant step in forming the endless belt of the invention. By a suitable cutting or shaving operation along both side edges of the joined endless strip of leather, material is removed to form continuous parallel side ledge regions 24 recessed from the flesh surface 17 and joined by continuous curved fillet-like surfaces 25 to the original thickness central portion 26 of the leather strip.

The depth of each ledge is one-half the original thickness of the leather strip. Along both outer edges of the leather strip the ledge outer edges are cut and shaped to form continuous curved surfaces 27 that correspond in shape and size to surfaces 25.

The construction shown in FIGURE 5 illustrates a cutting or shaving operation along both edges of the belt where material is removed to form a chamfer 33 on the ledge regions 24 and joined by the continuous curved fillet-like surfaces 25 to the original thickness central portion 26 of the strip.

FIGURE 6 illustrates an alternative construction in which the cutting or shaving operation is carried out in two stages material being removed to form a stepped ledge 34.

FIGURE 7 illustrates a belt made from a single ply belt with the thicker central portion being formed by attachment of a reinforcing ply 35 chamfered along the longitudinal edges. The flesh side 17 of the material is correspondingly chamfered along the marginal edges and folded back on themselves through 180° as shown by the arrow Y and secured by adhesive spread along the contiguous surfaces to the chamfered surface of the reinforcing ply 35.

FIGURES 8 and 9 are perspective views of a portion of an endless belt the ends of which are secured together by the scarf joint 23 and with the inturned edges as shown in FIG. 5 before and after the chamfered edges forming the ledge region have been folded back. Assuming the direction of travel of the belt to be represented by the arrow X the scarf joint 23 will within the centre flesh side portion 17 of the belt have a leading edge at the point 37 and a trailing edge at the point 38. When the ledge region 24 of the chamfered longitudinal edge is folded back upon itself the trailing edge 38 within this ledge region will be folded over to point 39 (FIG. 9) in line with the trailing edge of the centre portion 17 of the belt whilst the continuous chamfered edge 24 will be folded over so as to overlie the leading edge 37 of the joint immediately adjacent to the centre portion thus covering and securing the leading edge 37 at the point in the width of the belt body where the thickness begins to taper off into the ledge region.

Figure 1:
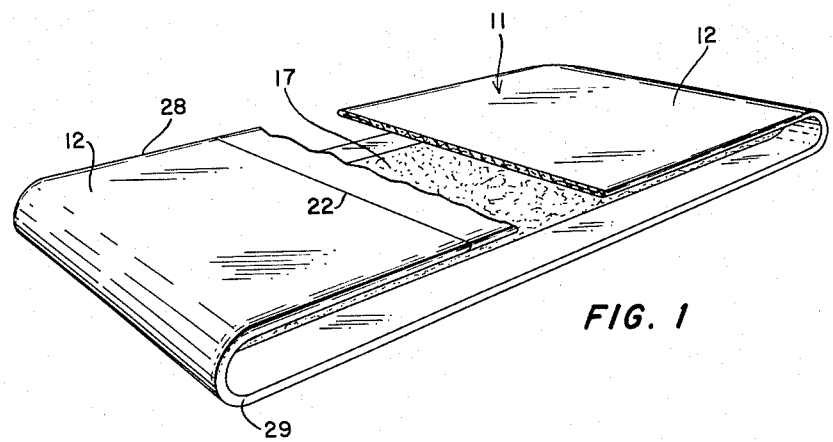
FIGURE 1 is a generally perspective view of a finished endless leather belt according to a preferred embodiment of the invention, partially broken away and sectioned.
Figure 4:
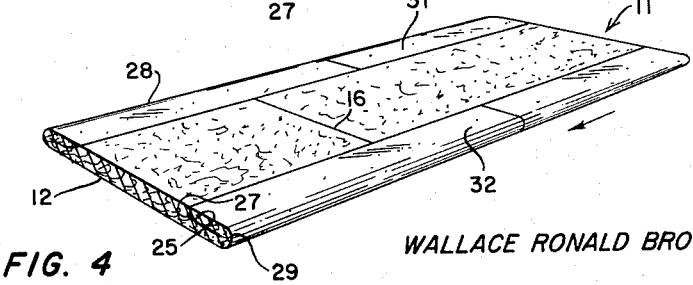
FIGURE 4 is a fragmentary section of the finished belt showing the side edge folded construction.

The finished endless belt 11 exists as shown in FIGURES 1, 4 and 9. The outer surface 12 is smooth and continuous except for the single insignificant smooth transverse seam at thin edge 22, so that it does not snag contacting fibers. The belt is of uniform substantially integral cross section, and its opposite side edges 28 and 29 are rounded and smooth since they represent portions of the hair side of the leather, thus eliminating snagging of fibers along the belt edges. The original uniform thickness of the leather strip is maintained in the finished belt, and the provision of smooth folded over edges reduces wear along the belt edges. In raw edge belts there is a greater tendency to wear thinner adjacent the edges.

Except where circumstances demand that the belt should be employed inside out or with its edge portions folded onto its outer surface the provision of continuous smooth inner side regions 31 and 32 as shown in FIGURE 4 helps insure that the belt will run straighter on a smooth pulley.

The foregoing endless belt construction, while enjoying the above advantages, is also stronger to resist longitudinal separation at the scarfed joint 23 due to the effective staggered interlock of the joint surfaces. When the ledge regions 24 are folded over and cemented in place the surfaces at the scarf joint are effectively longitudinally distributed so that the unit stresses tending to separate at the joint are reduced. The belt is relatively simple to fabricate, and waste is reduced. It has been found that belts may be made from thinner leather strips in the invention.

It is essential to the novel method of the invention that the step of securely attaching the scarfed ends of the original width strip be first carried out, followed sequentially by the formation of the side recesses and folding over the side edges.

While I have described the invention in its preferred embodiments, as applied to a leather belt, the principles thereof are likewise applicable to forming endless belts from strips of leather having the hide or grain side removed so that both surfaces are rough like the flesh side and from strips of other materials such as rubber or plastic, and from strips comprising more than one ply of material. Belts may be employed inside out.

The invention may be embodied in other specific forms without departing from the spirit or essential characteristics thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An endless belt formed from a continuous strip of material having its ends joined in a transverse joint entirely across the belt and comprising oppositely tapering wedge-shaped end edge regions cemented in face to face relation, said strip having along each side including through said joint parallel longitudinal edge portions of reduced thickness inturned and folded upon themselves and into edge abutment with opposite side edges of the thicker central portion of the strip after the transverse joint has been formed whereby said belt is of uniform width and thickness throughout.

2. An endless belt formed from a continuous strip of constant width and thickness material having its longitudinally opposite ends permanently joined in a transverse joint entirely across the belt and comprising oppositely tapering end regions permanently secured in face to face relation to provide a uniform width joint having the original strip thickness, said strip having along each side including through said joint parallel longitudinal edge portions of reduced thickness inturned and folded upon themselves and into edge abutment with opposite side edgs of the thicker central portion of the strip after the transverse joint has been formed whereby said strip is of uniform width and thickness throughout, said folded edge portions being permanently secured to themselves and said central portion.

3. An endless belt formed from a continuous strip of leather having its longitudinally opposite ends joined in a transverse joint entirely across the belt and comprising oppositely tapering wedge-shaped end edge regions cemented in face to face relation, said joined strip having along each side including through said joint parallel longitudinal edge portions of reduced thickness inturned and folded upon themselves and into edge abutment with opposite side edges of the thicker central portion of the strip after the transverse joint has been formed whereby said strip is of uniform width and thickness throughout, said folded edge portions being permanently cemented to themselves and to said thicker central portion.

4. In the endless leather belt defined in claim 3, said strip having a flesh side and a hide side, said hide side being outwardly disposed when said end regions are longitudinally joined, and said reduced side edge portions being formed by cutting leather from the inner flesh side, whereby in the finished belt the outer surface is substantially smooth and continuous and has rounded side edge extensions into the inner side margins.

5. In the endless leather belt defined in claim 3 said strip having a flesh side and a hide side, said hide side being outwardly disposed when said end regions are longitudinally joined, and said reduced side edge portions being formed by cutting leather from the inner flesh side on a chamfer to form a tapered surface with a curved fillet-like surface joining the edge portions to the central portion and with correspondingly formed outer edges whereby when the edge portions are inwardly folded over upon themselves through 180° the contiguous surfaces form a finished belt of substantially uniform thickness throughout.

6. An endless belt formed from a continuous strip of leather having its longitudinally opposite ends joined in a transverse joint entirely across the belt and comprising oppositely tapering wedge-shaped end edge regions cemented in face to face relation to form a scarf joint, said joined strip having along each side including through said scarf joint coextensive longitudinally chamfered edge portions of reduced thickness inturned into edge abutment with a thicker longitudinal centre portion of the strip after said scarf joint has been formed, said scarf joint having a leading edge and a trailing edge in the thicker centre portion of the belt with said inturned chamfered edge portions overlying the leading edge of the joint immediately adjacent to said thicker portion thus covering and securing the leading edge at the point in the width of the belt where said thicker portion begins to taper off into said chamfered portions.

7. An endless belt formed from a reinforcing ply and a strip of material secured thereto, said strip having its longitudinal opposite ends joined in a transverse joint entirely across the belt and comprising oppositely tapering wedge-shaped end edge regions cemented in face to face relation said joined strip having along each side including through said joint parallel edge portions of reduced thickness inturned and folded upon themselves and into abutment with correspondingly shaped opposite side edges of the reinforcing ply after the transverse joint has been formed whereby said belt is of uniform width and thickness throughout, said folded edge portions being permanently cemented to themselves and to the shaped edges of the reinforcing ply.

References Cited by the Examiner

UNITED STATES PATENTS

| | | | |
|---|---|---|---|
| 1,674,584 | 6/1928 | Anderson | 2—338 |
| 1,741,106 | 12/1929 | Griffith | 74—231 X |
| 2,403,617 | 7/1946 | Skeyhan | 74—232 |
| 2,429,119 | 10/1947 | Bloomfield. | |
| 2,748,044 | 5/1956 | Seiler | 74—232 |

FOREIGN PATENTS 4,574    1892    Great Britain.

DON A. WAITE, *Primary Examiner.*